US012582909B2

(12) United States Patent
Thwaites

(10) Patent No.: US 12,582,909 B2
(45) Date of Patent: Mar. 24, 2026

(54) SYSTEM AND METHOD FOR CONTROLLING AUDIO

(71) Applicant: Sony Interactive Entertainment Europe Limited, London (GB)

(72) Inventor: Joe Thwaites, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 418 days.

(21) Appl. No.: 18/100,292

(22) Filed: Jan. 23, 2023

(65) Prior Publication Data

US 2023/0233941 A1     Jul. 27, 2023

(30) Foreign Application Priority Data

Jan. 27, 2022     (GB) ...................................... 2201047

(51) Int. Cl.
| | |
|---|---|
| *A63F 13/54* | (2014.01) |
| *A63F 13/215* | (2014.01) |
| *A63F 13/424* | (2014.01) |
| *G06F 3/16* | (2006.01) |

(52) U.S. Cl.
CPC ............ *A63F 13/54* (2014.09); *A63F 13/215* (2014.09); *A63F 13/424* (2014.09); *G06F 3/165* (2013.01)

(58) Field of Classification Search
CPC ...... A63F 13/54; A63F 13/215; A63F 13/424; G06F 3/165
USPC ........................................................ 463/35
See application file for complete search history.

(56) References Cited

U.S. PATENT DOCUMENTS

| | | | | |
|---|---|---|---|---|
| 9,959,344 | B1 * | 5/2018 | Shepard | .................. G06F 16/61 |
| 10,224,024 | B1 * | 3/2019 | Sanders | .............. G10L 21/0272 |
| 10,726,856 | B2 * | 7/2020 | Le Roux | .............. G10L 19/032 |
| 2008/0134866 | A1 | 6/2008 | Brown | |
| 2010/0100820 | A1 * | 4/2010 | Bryant | .................... A63F 13/52 |
| | | | | 715/727 |
| 2015/0222239 | A1 * | 8/2015 | Zhang | ...................... H03G 3/20 |
| | | | | 381/61 |
| 2019/0147852 | A1 * | 5/2019 | Bakish | .................... G10L 15/07 |
| | | | | 704/231 |
| 2020/0090676 | A1 * | 3/2020 | Nandi | ................. G10L 21/0208 |
| 2021/0407510 | A1 | 12/2021 | Wang et al. | |

FOREIGN PATENT DOCUMENTS

WO          2014101605 A1     7/2014

OTHER PUBLICATIONS

Extended European Search Report for Application No. 23151600.6 dated Apr. 26, 2023. 7 pgs.
Communication pursuant to Article 94(3) EPC for Application No. 23 151 600.6 dated Apr. 23, 2024. 5 pgs.
Combined Search and Examination Report for Application No. GB2201047.4 dated Oct. 6, 2022. 8 pgs.

* cited by examiner

*Primary Examiner* — Allen Chan
(74) *Attorney, Agent, or Firm* — Kilpatrick Townsend & Stockton LLP

(57)     ABSTRACT
A system comprising: an event detection unit, configured to detect a significant event associated with a video game environment and to selectively output an indication of a detected event; and a separation unit configured to perform source separation on music in playback in dependence upon the indication from the event detection unit, and an audio output unit configured to output for playback audio derived from the result of source separation by the separation unit.

20 Claims, 3 Drawing Sheets

Detecting a significant event associated with a video game environment — S110

Performing source separation on music in playback in dependence on the detection of the significant event — S120

Outputting for playback audio derived from the result of source separation — S130

SYSTEM AND METHOD FOR CONTROLLING AUDIO

CROSS-REFERENCE TO RELATED APPLICATIONS

The present application claims priority to GB Application No. 2201047.4, filed on Jan. 27, 2022, the disclosure of which is hereby incorporated herein by reference.

BACKGROUND OF THE INVENTION

Field of the Invention

The following disclosure relates to systems and methods for processing audio within an audio-visual entertainment, particularly to systems and methods for processing audio within a video game environment. Computer programs, systems and devices implementing the methods are also described.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Audio-visual entertainment such as movies and video games combine a vast number of audio, visual, and/or sensory content to deliver a multi-media experience to the user. Each sensory medium makes use of a large array of constituent assets to generate and provide the desired user experience. Video game environments, for example, are accompanied by various audio tracks such as background music, character dialogue, and a wide range of sound effects. In some cases, video games are also played by multiple users connected through a network and communicating through an audible voice chat.

Whilst each audio track is implemented with a purpose of enhancing immersion and the ensemble designed to come together in harmony to create the overall user experience, in some particular instances there can be interference between some or all of the audio elements. For example, where a video game environment is accompanied by music having a vocal track, dialogue in or associated with the game can be obscured by the words in the vocal track. Such simultaneous (or near-simultaneous) speech can cause audible confusion to the user such that one or more of the music or dialogue can be missed and can even cause undesirable effects such as nausea to the user.

It is possible to lower the volume of the music or other audio elements in the mix whilst dialogue is present in the game environment or other audio-visual media—a technique known as ducking. This is a relatively brute-force solution and can result in a music track which is constantly changing in volume, which detracts from the immersion and overall user experience, and which can also cause nauseating effects to the user.

Accordingly, it is desirable to provide an audio-visual experience which retains the full audio-visual experience whilst providing the ability for important speech and other audio elements to be recognised and understood by the user.

SUMMARY OF THE INVENTION

According to a first aspect, the present disclosure provides a system comprising: an event detection unit, configured to detect a significant event associated with a video game environment and to selectively output an indication of a detected event; and a separation unit configured to perform source separation on music in playback in dependence upon the indication from the event detection unit, and an audio output unit configured to output for playback audio derived from the result of source separation by the separation unit.

By detecting important events and performing source separation on certain elements of the audio experience, it is possible to dynamically adapt pre-produced audio to better accompany other audio elements in, or associated with, the video game environment. In this way, key features of the music in playback can still be preserved whilst seamlessly removing certain elements of that music which may clash with other audio elements in or associated with the game. Furthermore, as the system is configured to dynamically detect and adjust certain audio elements in real-time, it is possible to provide the tailored solution for any pre-produced music and there is no need to specifically adjust the music for each scene.

The significant event in the video game environment may be, or be associated with, one of any number of events. For example, dialogue such as voiceover, narration, and voice tracks in other secondary music, or dialogue from voice chat associated with the game, may be considered as the significant event. Accordingly, the event detection unit may be configured to detect dialogue associated with the video game environment as a significant event. As disclosed herein, music and other audio tracks can obscure dialogue in playback and create confusion (and other undesirable effects) for the user. By detecting the presence of dialogue in, or associated with, the game environment and altering certain other elements of audio such as music in playback through source separation, the audio experience can be dynamically adjusted to provide the intended user experience whilst improving intelligibility of speech.

In the case that the significant event comprises dialogue, the dialogue associated with the video game environment may comprise dialogue having a source within the video game environment. For example, the event may be associated with speech from an in-game character or voice-over narration. The event could also be associated with pre-recorded speech from the user or other users. In some examples, the dialogue associated with the video game may comprise audio from a voice chat relating to, or associated with, the video game environment. Speech from voice chat may be understood to mean audio that is produced by a user—e.g., a user utterance, as opposed to solely computer-generated audio that is associated with an audio event. Such speech generally has its source from a microphone connected to a computer or gaming system, the microphone configured to receive a user's voice and transmit the speech audio, typically across a network.

When character dialogue and vocals of music are in different languages, there may be a reduced chance of confusion for the user. The system may comprise a further, language detection module configured to detect the language of any speech detected by the detection unit. The language detection module may also be configured to detect the language of any music in playback, or the language of any separated vocal tracks. In such a case, the separation unit may be configured to perform source separation in additional dependence upon the language, or languages detected by the language detection module. For example, where the language detection module detects character dialogue in a first language, the source separation may only be performed on the music in playback (and volume of the vocal track reduced, for example) if that music is in the same language as the first language. If the music in playback is in a second language different from the first language, the source separation may not be performed, or may still be performed but the effect applied to the vocal track could be different to cases where the dialogue and music are in the same language. Such language information may be included as part of the indication originating from the detection unit.

Optionally rather than detecting the language, the language of any music lyrics could be indicated for example via metadata. Meanwhile the language of any potentially clashing in-game dialogue may similarly be indicated by metadata or by the user's choice (where multiple dialogue languages are available). Meanwhile where relevant the users own spoken language may, to a first approximation, be inferred from a language setting previously chosen for the system user interface, which is likely to be indicative of the user's first language. For incoming speech from other users, their similarly inferred respective language can be transmitted as metadata at least once with their speech. The language detection module may thus optionally use such metadata and contextual indicators as an alternative or complement to detection of a language.

The indication output by the event detection unit may comprise audio characteristics associated with the detected significant event. For example, the indication may comprise a signal carrying data relating to the audio characteristics associated with the detected significant event. In an example where the detected significant event is dialogue associated with the game, the audio characteristics may for example include one or more of pitch, duration, and volume, of the dialogue audio, as well as information about a character from which the dialogue originates, and information about events in, and state of, the in-game environment. The separation unit may be configured to perform the source separation in dependence upon the audio characteristics. That is, the way in which the source separation is performed may be affected by the particular characteristics of the detected event (e.g., characteristics of the detected dialogue audio). For example, when a low pitch dialogue is detected with low-frequency speech signals, the source separation on the music may be performed such that low-frequency voice tracks are separated and filtered (e.g., removed or lowered in volume) but high-frequency voice tracks are kept in and remain unaltered. Alternatively the low-frequency layers of the music may be separated and altered so as to create less confusion to the user against the low-frequency dialogue.

The indication may characterise the duration of the detected event, such that the source separation can take place for only as long as the event lasts, or at an overlapping 'dovetailed' interval having a lead-up and lead-out period (e.g., if the event has a duration of 5 seconds, the music may be altered for 7 seconds, with 1 second before and 1 second after the duration). As such the indication may be a one-off transmission for each event, sent at the beginning or in advance of the event. Alternatively, the indication may be a continuous signal indicating the continuing occurrence (or not) of an event—e.g., the signal is present for as long as an in-game character is speaking, and falls off as soon as the character stops speaking.

The separation unit may be configured to perform source separation to separate one or more vocal tracks from the music in playback. The separation unit may also be configured to reduce the volume of the one or more vocal tracks in dependence upon the indication from the event detection unit. The separation unit may be further configured to modify audio characteristics of the one or more separated vocal tracks in dependence upon the indication from the event detection unit. In other examples, the separation unit may be configured to perform source separation to separate one or more other tracks—not vocal tracks—from the music in playback.

The audio output unit may be configured to generate multiple channels of audio based on the result of source separation by the separation unit, and to output a multi-channel audio for playback. The source separation may generate multiple viable tracks from the original source music in playback. In a simple example the music may be separated to an instrumental track and a vocal track. The audio output unit may send the instrumental track to one channel and vocal track to another channel. This may be done before or after modifications, such as volume reduction, pitch alteration or others disclosed herein, are made to each of the tracks. The audio output unit may therefore be configured to output a multi-channel audio for playback, the multi-channel audio comprising separated vocal tracks in channel and dialogue from the game in another channel. With such a multi-channel output, it is possible to provide to the user the option of choosing how each of the tracks is output. For example, the audio output unit may be configured to send in-game dialogue to one channel and vocals from the music to another separate channel. The vocals and dialogue may be played back from separate speakers, so as to reduce the chance of confusion.

The output unit may be configured to perform checks on the quality of the modifications made by the separation unit. For example, the audio output unit may be further configured to detect artifacts in the result of source separation and to adjust audio characteristics of the output audio for playback.

The system may further comprise an audio input unit configured to identify or generate music in playback. The system may also comprise a microphone. The microphone may be part of the audio input unit or a separate peripheral device. The microphone may be arranged to receive user input speech. The detection unit may be configured to detect speech input through the microphone as a significant event. This may be helpful if for example audio is playing through speakers (which may be positioned near the microphone and thus the audio picked up through the microphone) whilst the user is recording his/her speech through the microphone for a voice chat, for example. If the audio in playback contains voice, the user's recorded speech may become confused with the voice in the audio in playback. Once it is detected that the microphone is in use the volume on the voice in the audio may be reduced or otherwise altered so as to reduce the risk of confusion with the recorded speech or the event that plays the new audio maybe delayed or altered so that the playback does not clash with the current voice input.

There may be certain types of events which cause more aural confusion to the user than others. For this, the system may further comprise a user recognition unit, configured to detect one or more types of events which cause confusion to a user of the video game environment. The user recognition unit may be configured to monitor user behaviour in response to trigger events in the game environment and detect confusing events. For example, where a user is clearly missing certain instructions from voice over narration, this can be detected by the recognition unit. In some examples the user recognition unit may employ a machine learning model to learn the user behaviour and train a model to predict the types of events which cause confusion; such confusing events can then be set as the significant event which is configured for detection by the detection unit. The recognition of confusing type events can be done concurrent with, or prior to, the detection and source separation of certain audio elements relating to certain events (some events may be pre-set before the user recognition unit has opportunity to learn and predict). In other cases the recognition unit may be configured to generate user input requests in (or associated with) the game environment such that the user may flag certain events as being difficult to hear. It may for example be the case that the dialogue of a certain character (with a voice with particular pitch, for example) is especially hard to hear over music. By recognising certain significant events which are more prone to confusion, the system can respond by adjusting the music (or other elements) to mitigate such issues. Accordingly the recognition unit may be configured to operate the detection unit to detect as significant events the events which have been recognised by the recognition unit to cause confusion. This may be particularly beneficial for example for users with partial hearing loss, or hearing loss predominantly in one ear; such users may vocal clashes in certain frequency ranges more difficult to understand than others, or find vocals situated to the left or right more difficult to understand. The system may thus learn one or more frequency ranges in which the events may cause confusion, and/or one or more directions (or angular ranges in which the events may cause confusion.

According to a second aspect, the present disclosure provides a method, comprising the steps of: detecting a significant event associated with a video game environment; performing source separation on music in playback in dependence on the detection of the significant event, and outputting for playback audio derived from the result of source separation.

It will be appreciated that any one or more of the features described above with respect to the first aspect of the disclosure may be adapted and applied to the second aspect. For example, the methods of the second aspect may be adapted to include steps to perform any one of the functionalities described above with respect to the systems of the first aspect—associated with the same or similar technical advantages.

According to a third aspect, the present disclosure provides a computer program comprising instructions which, when executed by a computer of an audio-visual entertainment system, cause the computer to control the audio-visual entertainment system to perform a method according to the second aspect.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
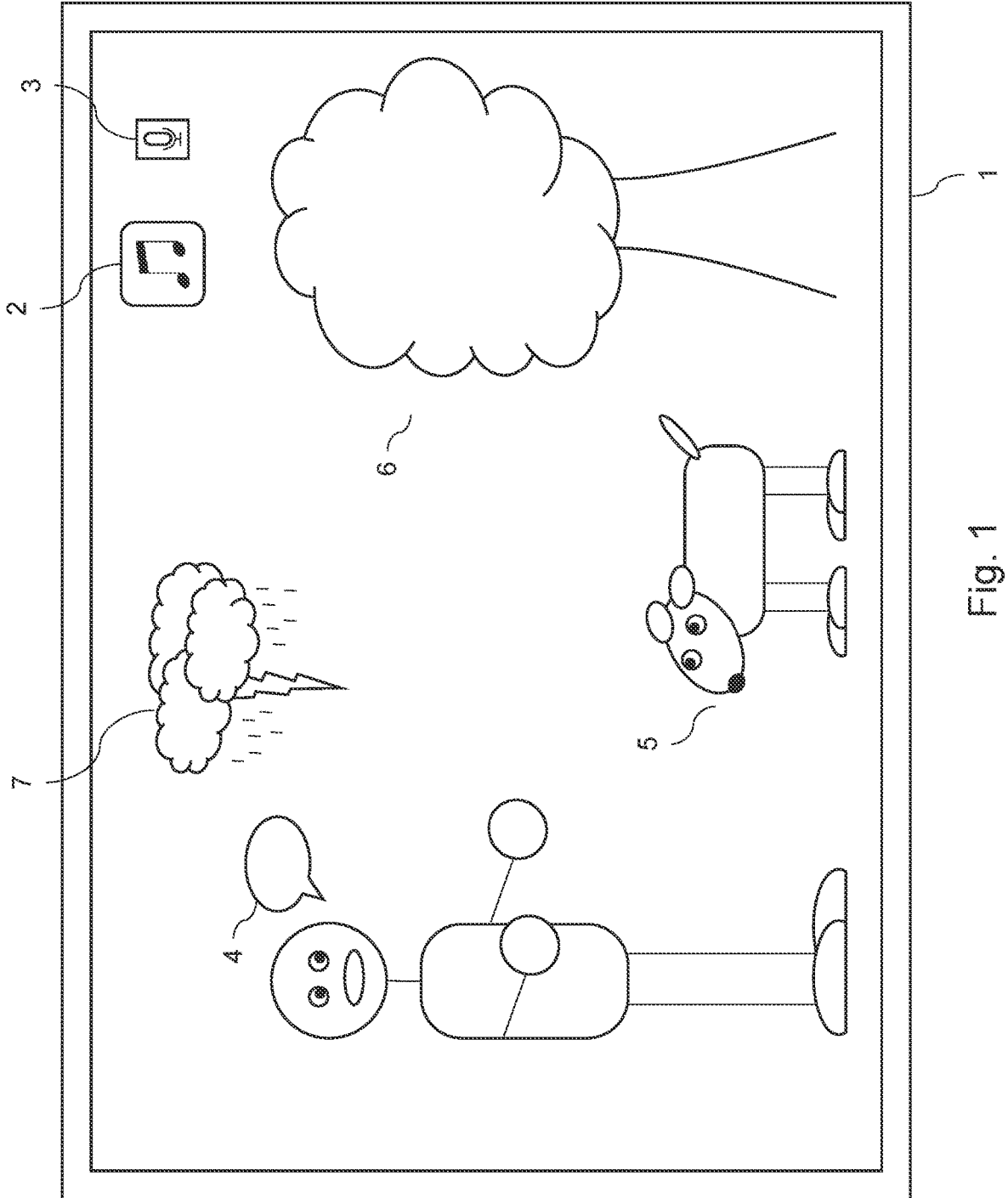
FIG. 1 is a schematic illustration of an audio-visual entertainment system in association with which a method according to the invention may be implemented.

An aspect of the present disclosure is a system for adjusting characteristics of audio within, or associated with, an audio-visual entertainment system. An exemplary environment within such an audio-visual entertainment system is illustrated in FIG. 1.

The example multi-media environment 1 comprises a variety of audio sources, each capable of producing sounds to be played back through an audio output and transmitted to the user. The environment could be, for example, a scene in a motion picture such as a movie or a TV show, or a video game environment.

In this example, the scene is in a video game and comprises a speaking character producing dialogue 4 originating from the mouth of the character, an animal producing animal audio 5, weather and foliage producing atmospheric audio 6, and a weather event—e.g., lightning—generating audible thunder effects 7. Furthermore, background music 2 is playing, and a voice chat 3 associated with the game environment 1 also activated.

Background music 2 is associated with the game environment. The background music 2 typically comprises one or more instrumental elements (e.g., strings, percussion, brass) and one or more voice elements, and the music 2 is generally loaded within the game environment as a single pre-mixed track. The music 2 can be pre-recorded music and can be stored and/or loaded as part of the game environment. Alternatively, or in combination, the music 2 can be music stored in other locations (for example in the user's personal data storage separate from the location of the game storage, or in a database accessible via a network). The music 2 can also be procedurally generated by use of a neural network, for example.

The character dialogue 4 comprises speech. The speech is generally derived from pre-recorded audio, for example from a voice over artist, and can be arranged to play back together with animation of the character model. In some examples the speech is procedurally generated, for example through a machine learning model utilising a neural network—which may generate the speech according to some input factors such as an event occurring or the user's actions in the game world.

Speech is typically in a single language, but in some examples can comprise multiple languages—for example a portion of the speech may be in a first language, and then a second portion may be in a second language, after which the speech may revert to the first language or move to a third language different from the first and second languages.

Whilst in the example scene of FIG. 1 the character is visible within the frame, in other examples the character dialogue 4 may equally be a narration, with the originating character (or voice over actor) not appearing in the scene. The in-game environment 1 can comprise multiple such characters outputting various different audible dialogues 4 as described above.

The environment also comprises other sources of audio. For example, the example scene 1 comprises an animal producing barks and other animal-related sound effects 5. As with the character dialogue 4, such animal sound effects can accompany animation of the animal's visual model. Although the animal sound effects 5 are not generally speech or dialogue, in some cases they can be treated as such. In some examples the animal sound effects 5 can contain elements of dialogue, and/or portions of fully voiced over (or procedurally generated) dialogue in one or more human languages.

Other elements of the scene may also generate audible sound effects, such as weather and foliage. For example, rain, wind, and rustling of leaves on a tree can all contribute to such atmospheric sound effects 6. Whilst such atmospheric effects 6 generally do not comprise spoken word dialogue, in some cases as with the animal sound effects, the effects can contain elements of dialogue intended to be recognisable as such by the user. Whilst some weather effects are constant or last for a pre-determined period of time (such as rain), some other effects can be one-off events, or responsive to user action. For example, lightning can happen as a timed event or as an action in response to a user action, and can be accompanied by one-off sound effects such as thunder 7. Other examples of one-off sound effects 7 include user-triggered gunfire and footsteps in response to user movement within the game world. Some such one-off sound effects can also comprise speech and can be detected as such.

As noted above, the example video game environment 1 is associated with audio from a voice chat 3. The voice chat functionality can be built-in to the video game environment, or a standalone process that runs concurrent with the game. The voice chat provides audio from user-input speech, typically picked up by an input device such as a microphone connected to a gaming system or associated peripherals. The voice chat audio 3 generally comprises speech, or dialogue, from other users.

Figure 2:
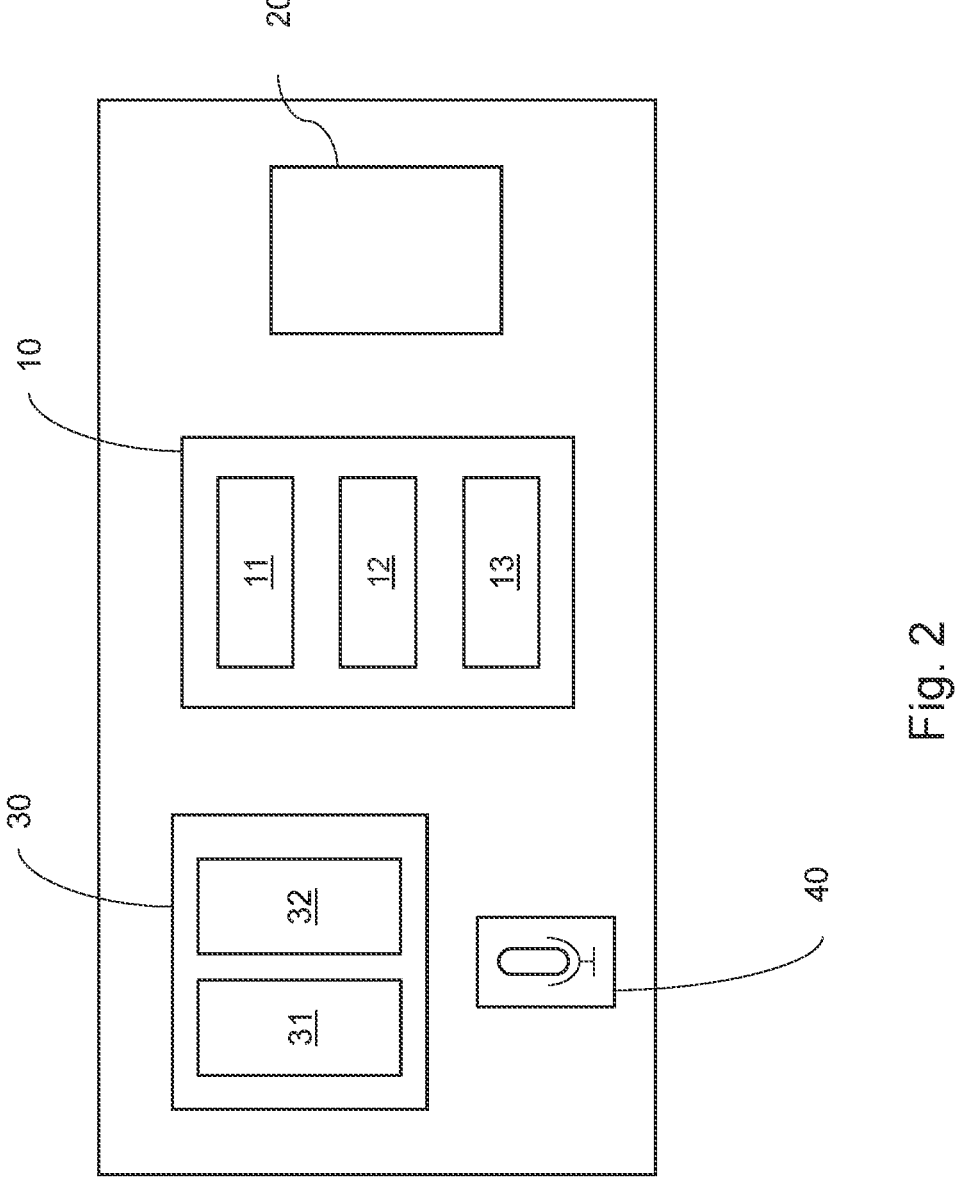
FIG. 2 is a schematic illustration of an example system in an assembled configuration.

FIG. 2 is a schematic block diagram of an example system 10 configured to modify certain characteristics of audio associated with an audio-visual entertainment system, such as that described in reference to FIG. 1 above. The features of FIG. 2 may appear in a video game system such as a console or computer. In this example the system is part of a video game set up with a gaming system 20, an audio system 30 and a connected microphone 40.

The example gaming system 20 is a video game console configured to generate graphics, audio and control function-alities for loading a game environment such as that illus-trated in FIG. 1. The audio system 30 can take the result of processing by the system 10 to output the final audio through multiple speakers 31, 32. Whilst the system 10 is illustrated in FIG. 1 as being separate from the gaming system 20 these two can also be integrated as part of a single system, and can also be integral with audio system 30 and microphone 40. The system 10 could also be part of a cloud network connected to multiple gaming systems 20 through a network connection and arranged to provide remote audio processing to multiple such gaming systems 20.

The example system 10 is configured for modifying audio associated with an audio-visual entertainment system, and comprises an event detection unit 11, a separation unit 12 and an audio output unit 13. In this example the system 10 is configured for modifying audio associated with a video game environment.

The event detection unit 11 is configured to detect a significant event associated with a video game environment. A purpose of the event detection unit 11 is to identify moments which require modification of audio to reduce confusion for the user audience. The event detection unit 11 in this example is also configured to selectively output an indication of a detected event. Such an indication can be used by other units in the system 10 to perform relevant processes only when required and to an appropriate or desirable degree.

The separation unit 12 in the example system 10 is configured to perform source separation on music in play-back. Source separation typically refers to a process by which one or more sets of source signals is separated from one or more sets of mixed signals, typically without access to information about the source signals or knowledge of the mixing details. The process can be used to recover original sets of signals that constitute individual tracks such as one or more instrumental tracks and vocal tracks. Music 2 in playback in, or associated with, an audio-visual scene 1 is generally labelled as such and so the separation unit 12 can simply take the music in playback as input and perform the appropriate source separation. In some examples, the system further comprises an audio input unit configured to identify or generate music in playback. For example, where music is part of ambient audio 6 (such as a radio playing in the background) or is concurrent with dialogue (such as a character singing a capella or with an instrument), the audio input unit can be configured to identify music currently in playback such that the separation unit can perform source separation on the music identified by the audio input unit. In some examples, the audio input unit is configured to gen-erate new music. Whilst in this example the source separa-tion is performed on music in playback, in other examples, the separation unit 12 can be configured to perform source separation on other audible aspects of the environment such as dialogue 4 or ambience audio 6.

The audio output unit 13 is configured to output for playback audio derived from the result of source separation by the separation unit 12. That is, the audio output unit 13 is configured to take audio output by the separation unit 12 and arrange the audio for playback.

Once source separation is performed by the separation unit 12 to result in one or more separated audio tracks, one or more of such separated audio tracks can be modified. Modified tracks can once again be combined with the other tracks to produce an output playback audio. Whilst the separation unit 12 itself can perform some modifications on the separated audio tracks, the audio output unit 13 is typically configured to perform certain modifications on the separated audio tracks. For example, the audio output unit 13 can be configured to identify a separated vocal track and reduce the volume of (or mute) the separated vocal track. The audio output unit 13 can also be configured to split the audio into various channels and arrange them for playback at different speakers—for example right speaker 31 and left speaker 32.

In use, the gaming system 20 generates a game environ-ment 1 having multiple sources of audio such as background music 2 in playback. When the detection unit 11 detects a significant event—such as audible dialogue 4 from an in-game character—the separation unit 12 takes the back-ground music 2 and performs source separation in real-time. The separation unit 12 separates one or more vocal tracks in the background music 2 and the audio output unit 13 reduces the volume of the vocal track for the duration of the audible dialogue 4. In this example the detection unit 11 indicates to the separation unit 12 the duration for which the dialogue is expected to last, and the vocal track of the music is reduced for that duration. The audio output unit 13 takes the result of the source separation and volume reduction and generates an output mix, which is output for playback instead of the original background music 2 at least for the duration of the speech. The audio is the output through the sound system 30—and where the audio output unit 13 generates a multi-channel output mix, the each of the channels can be output through separate speakers 31, 32.

Figure 3:
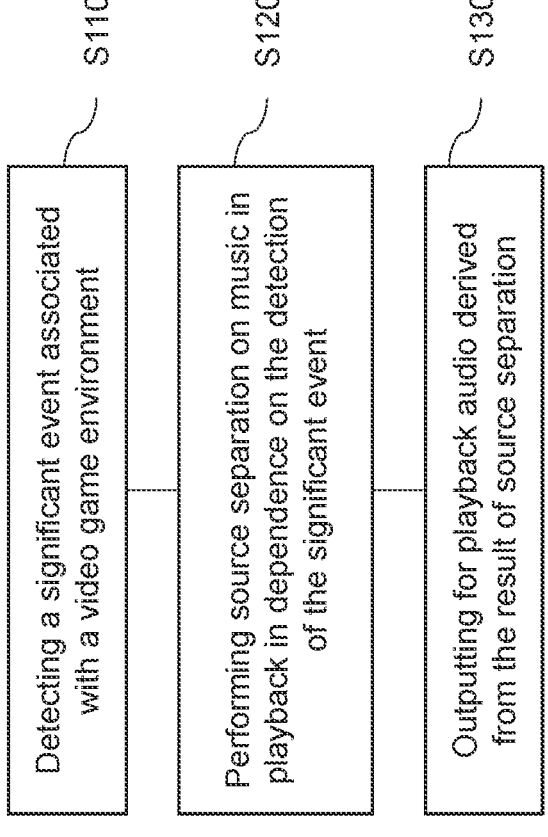
FIG. 3 is a schematic illustration of an example method for modifying characteristics of audio associated with audio-visual entertainment.

FIG. 3 is a flow chart schematically illustrating steps of an example method as disclosed herein.

At step S110, a significant event associated with a video game environment is detected. In some examples, the sig-nificant event to be detected is dialogue or other audible speech in the video game environment. In some examples, the significant event is dialogue or speech in a voice chat associated with the video game environment. This step can be performed by a detection unit of the type described herein for example with reference to FIG. 2. In other words, the step S110 can be implemented by configuring or controlling a detection unit 11 to detect a significant event associated with the video game environment. In some examples, the step can comprise a sub-step of generating a signal indicative of the detected significant event. Such a signal can comprise information indicating the nature, duration and other details about the detected event. In some examples, the signal is output for as long as the significant event is in occurrence. For example, considering character dialogue as the significant event, at the moment that character dialogue is detected in a game environment, a signal indicating this dialogue can be generated and output. That signal can then continuously be output until the moment that the dialogue is determined (e.g., by the detection unit) to be finished, at which point the signal will be cut off. In other examples, a first 'start' signal pulse can be output at the beginning of the event and a second 'end' signal pulse can be output at the end of the event.

At step S120, source separation on music in playback is performed. The source separation is performed in dependence on the detection made in step S110 of the significant event. In one particular example, the music in playback is separated into at least one vocal track and at least one instrumental track. In some examples, the step can comprise a sub-step of receiving a signal indicative of a detected event and performing source separation in dependence on the received signal. The source separation can be performed for the duration of the detected event. For example, if a significant event—such as character dialogue—has been detected in step S110 and the duration of the dialogue is 20 seconds, the source separation can be selectively performed for the duration of that 20 seconds of dialogue. Alternatively the duration across which source separation is performed can be dovetailed around (or offset from) the duration of the event. This step can be performed by a separation unit of the type described herein for example with reference to FIG. 2. In other words, the step S120 can be implemented by configuring or controlling a separation unit 12 to perform source separation on music in playback in dependence upon an indication of a detected significant event.

At step S130, audio derived from the result of source separation is output for playback. This step can further comprise the sub-steps of: receiving the result of source separation from step S120, and modifying audio characteristics of one or more of the tracks contained in the received result. For example, if the result of source separation comprises a vocal track and an instrumental track, the volume of the vocal track can be reduced at this step, for the reduction in volume being for the duration of the event detected at step S110. This step can be performed by an audio output unit of the type described herein for example with reference to FIG. 2. In other words, the step S130 can be implemented by configuring or controlling an audio output unit 13 to output for playback audio derived from the result of source separation.

Referring again to FIG. 2, in a summary embodiment of the present description, a system comprises an event detection unit, configured to detect a significant event associated with a video game environment and to selectively output an indication of a detected event; and a separation unit configured to perform source separation on music in playback in dependence upon the indication from the event detection unit, and an audio output unit configured to output for playback audio derived from the result of source separation by the separation unit, as described elsewhere herein.

In an instance of the summary embodiment, the event detection unit is configured to detect dialogue associated with the video game environment as a significant event, as described elsewhere herein.

In this instance, optionally the dialogue associated with the video game environment comprises dialogue having a source within the video game environment, as described elsewhere herein.

In this instance, similarly optionally the dialogue associated with the video game comprises audio from a voice chat relating to the video game environment, as described elsewhere herein.

In an instance of the summary embodiment, the indication output by the event detection unit comprises audio characteristics associated with the detected significant event, and wherein the separation unit is configured to perform the source separation in dependence upon the audio characteristics, as described elsewhere herein.

In an instance of the summary embodiment, the separation unit is configured to perform source separation to separate one or more vocal tracks from the music in playback and to alter one or more audio characteristics of the one or more vocal tracks in dependence upon the indication from the event detection unit, as described elsewhere herein.

In this instance, optionally the separation unit is configured to reduce the volume of the one or more separated vocal tracks in dependence upon the indication from the event detection unit, as described elsewhere herein.

In an instance of the summary embodiment, the audio output unit is configured to generate multiple channels of audio based on the result of source separation by the separation unit, and to output a multi-channel audio for playback, as described elsewhere herein.

In this instance, optionally the audio output unit is configured to output a multi-channel audio for playback, the multi-channel audio comprising separated vocal tracks in channel and dialogue from the game in another channel, as described elsewhere herein.

In an instance of the summary embodiment, the audio output unit is further configured to detect artefacts in the result of source separation and to adjust audio characteristics of the output audio for playback, as described elsewhere herein.

In an instance of the summary embodiment, the system further comprises an audio input unit configured to identify or generate music in playback, as described elsewhere herein.

In an instance of the summary embodiment, the system further comprises a user recognition unit, configured to detect one or more types of events which cause confusion to a user of the video game environment, and further configured to operate the detection unit to detect such events which cause confusion as the significant events, as described elsewhere herein.

In an instance of the summary embodiment, the system further comprises a microphone, wherein the detection unit is configured to detect the input of speech through the microphone as a significant event, as described elsewhere herein.

In an instance of the summary embodiment, as described elsewhere herein.

Referring now again to FIG. 3, in a summary embodiment of the present description a method comprises the steps of detecting a significant event associated with a video game environment, performing source separation on music in playback in dependence on the detection of the significant event, and outputting for playback audio derived from the result of source separation, as described elsewhere herein.

It will be apparent to a person skilled in the art that variations in the above method corresponding to operation of the various embodiments of the system as described and claimed herein are considered within the scope of the present invention.

It will also be appreciated that the above methods may be carried out on conventional hardware suitably adapted as applicable by software instruction or by the inclusion or substitution of dedicated hardware, such as for example the system described elsewhere herein.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system comprising:
one or more storage devices storing instructions;
one or more processors, that upon execution of the instructions, configured to:
receive an audio signal in a video game environment;
detect, based on the audio signal, an event associated with the video game environment;
perform source separation to separate one or more audio tracks from the audio signal in dependence upon the event; and
output the one or more audio tracks for playback.

2. The system according to claim 1, wherein the event is dialogue associated with the video game environment.

3. The system according to claim 2, wherein the dialogue associated with the video game environment comprises dialogue having a source among the audio signal.

4. The system according to claim 2, wherein the dialogue associated with the video game comprises audio from a voice chat relating to the video game environment.

5. The system according to claim 1, wherein the one or more processors are configured to selectively output audio characteristics associated with the event, and
wherein the processor is configured to perform the source separation in dependence upon the audio characteristics.

6. The system according to claim 1, wherein the processor is configured to alter one or more audio characteristics of the one or more audio tracks in dependence upon the event.

7. The system according to claim 6, wherein the processor is configured to reduce the volume of the one or more separated audio tracks in dependence upon the event.

8. The system according to claim 1, wherein the processor is configured to generate multiple channels of audio based on the result of source separation, and further configured to output a multi-channel audio comprising the multiple channels of audio for playback.

9. The system according to claim 8, wherein the processor is configured to output a multi-channel audio for playback, the multi-channel audio comprising separated vocal tracks in respective channels and dialogue from the game in another channel.

10. The system according to claim 1, wherein the processor is further configured to detect artefacts in the result of source separation and further configured to adjust audio characteristics of the output audio for playback.

11. The system according to claim 1, wherein the processor is further configured to identify or generate music in playback.

12. The system according to claim 1, wherein the processor is further configured to detect one or more types of events which cause confusion to a user of the video game environment, and further configured to detect such events which cause confusion as the events.

13. The system according to claim 1, further comprising a microphone, wherein the processor is configured to detect an input of speech through the microphone as the event.

14. The system of claim 1, wherein the one or more audio tracks comprise one or more vocal tracks.

15. A method, comprising:
receiving an audio signal in a video game environment;
detecting, based on the audio signal, an event associated with the video game environment;
performing source separation to separate one or more audio tracks from the audio signal in dependence on the detection of the event; and
outputting the one or more audio tracks for playback.

16. The method of claim 15, wherein the one or more audio tracks comprise one or more vocal tracks.

17. A non-transitory computer-readable medium having stored thereon computer-readable instructions which, when executed by a computer of an entertainment system, cause the computer to perform a method comprising:
receiving an audio signal in a video game environment;
detecting, based on the audio signal, an event associated with the video game environment;
performing source separation to separate one or more audio tracks from the audio signal in dependence on the detection of the event; and
outputting the one or more audio tracks for playback.

18. The method of claim 16, wherein the event is dialogue associated with the video game environment.

19. The non-transitory computer-readable medium of claim 17, wherein the one or more audio tracks comprise one or more vocal tracks.

20. The non-transitory computer-readable medium of claim 19, wherein the event is dialogue associated with the video game environment.

* * * * *